B. N. TRAUTMAN.
SEED EXTRACTING MACHINE.
APPLICATION FILED NOV. 22, 1916.

1,266,641.

Patented May 21, 1918.
2 SHEETS—SHEET 1.

WITNESSES
Jas. K. McCathran
Chas. H. Kesler

Burl N. Trautman, INVENTOR

BY

ATTORNEY

B. N. TRAUTMAN.
SEED EXTRACTING MACHINE.
APPLICATION FILED NOV. 22, 1916.
1,266,641.
Patented May 21, 1918.
2 SHEETS—SHEET 2.
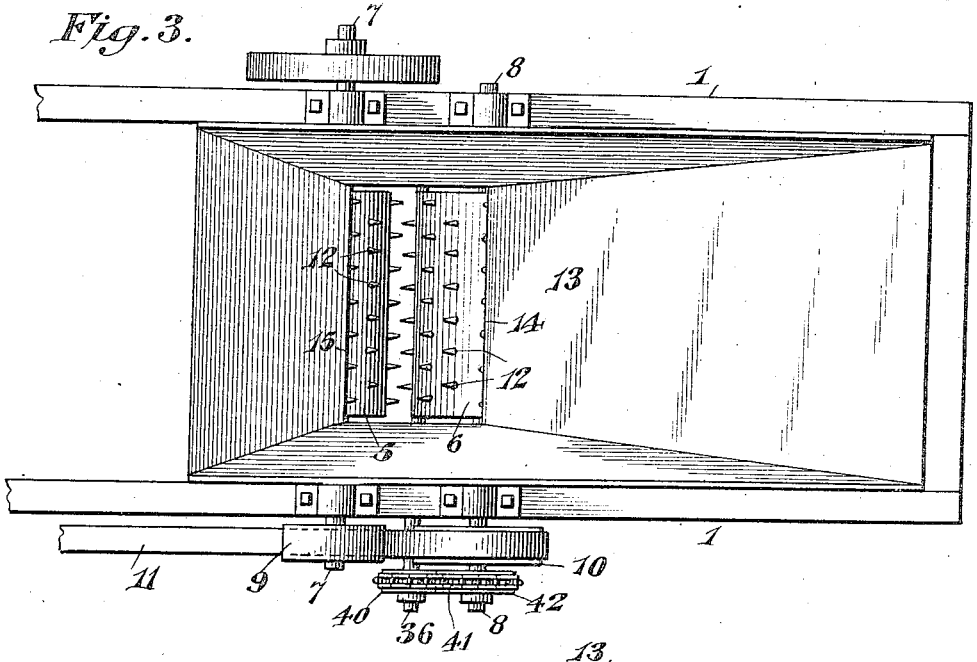
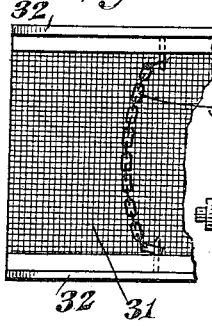
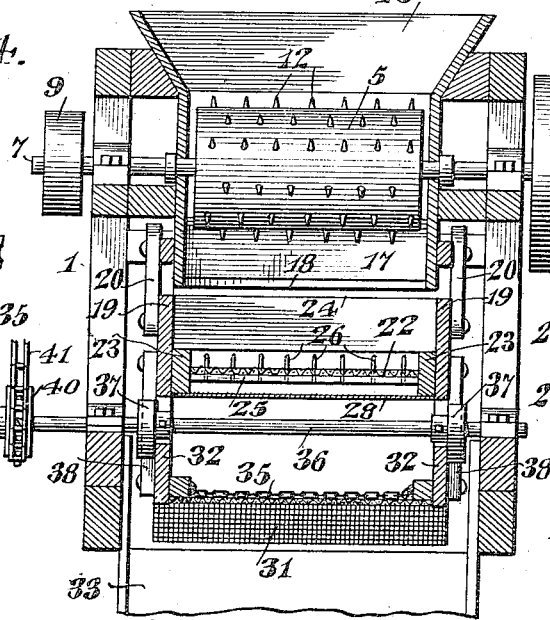
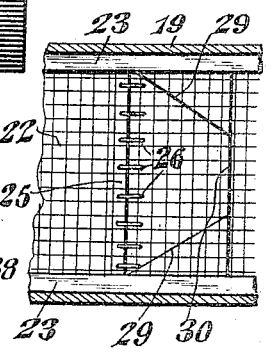
WITNESSES
Jas. K. McCathran
Chas. H. Kesler
INVENTOR
Burl N. Trautman
BY
C. G. Siggers
ATTORNEY

UNITED STATES PATENT OFFICE.

BURL N. TRAUTMAN, OF CONESVILLE, IOWA.

SEED-EXTRACTING MACHINE.

1,266,641.   Specification of Letters Patent.   Patented May 21, 1918.

Application filed November 22, 1916. Serial No. 132,865.

*To all whom it may concern:*

Be it known that I, BURL N. TRAUTMAN, a citizen of the United States, residing at Conesville, in the county of Muscatine and State of Iowa, have invented a new and useful Seed-Extracting Machine, of which the following is a specification.

This invention relates to seed extracting machines, especially adapted for extracting seeds from water-melons, musk-melons, pumpkins, and the like.

The object of the invention is to provide a construction which will thoroughly crush the product and quickly and efficiently separate the seeds from the crushed pulp.

In the particular embodiment of the invention herein illustrated and described, it is my intention to utilize rotating rolls provided with suitable teeth for crushing the material to be seeded. After the crushing operation, the crushed material is directed to a vibrating riddle having oppositely inclined screens, the upper one of which being of large mesh to allow the seeds to pass therethrough, and the lower one of which being of finer mesh to prevent the seeds passing therethrough. The upper screen is provided with devices for insuring the separation of the large pieces of crushed material and the seeds, while the lower screen is also provided with devices for crushing and pulverizing whatever pulp happens to drop thereon from the upper screen.

In the accompanying drawings, illustrating one embodiment of the invention:—

Fig. 3 is a plan view thereof.

Fig. 4 is a sectional view on the line 4—4 of Fig. 2, looking in the direction of the arrows.

Fig. 5 is a detail sectional view on the line 5—5 of Fig. 2, looking in the direction of the arrows.

Fig. 6 is a detail plan view of the lower end of the lower screen.

Figure 1:
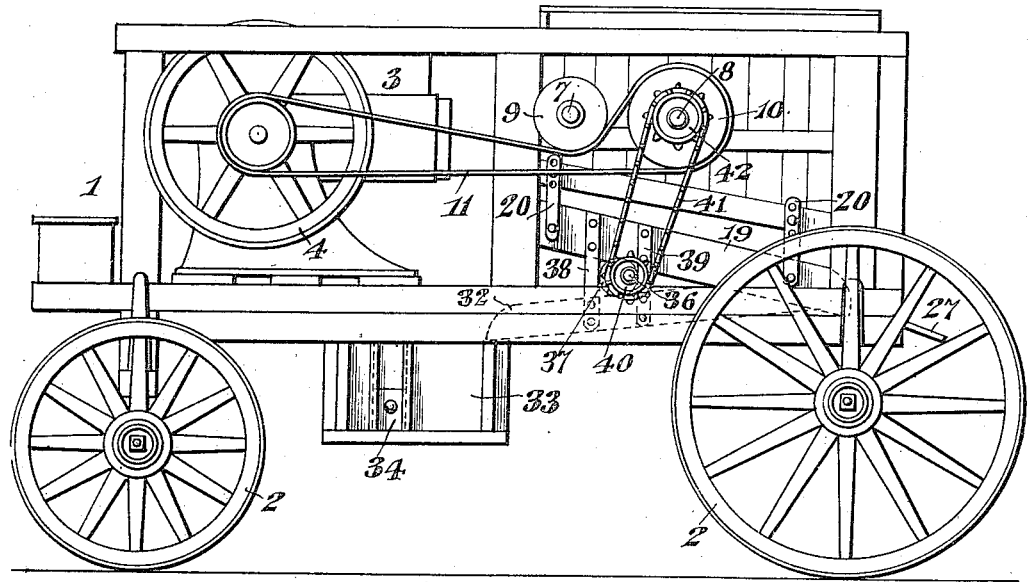
Figure 1 is a side elevation of my machine, the same being shown for the purposes of illustration as applied to a vehicle whereby it may be transported from place to place.

In the particular embodiment of the invention herein illustrated, I have shown the operating mechanism of my device applied to a suitable vehicle 1, provided with the usual supporting wheels 2. Mounted upon the vehicle is an engine 3, which may be of any well known type, and provided with a fly wheel 4. Crushing rolls or cylinders 5 and 6 fixed to shafts 7 and 8, suitably journaled in the framework of the vehicle, are provided for the purpose of crushing the material to be seeded.

As is clearly shown in Fig. 1, the shaft 7 is provided with a suitable pulley 9, while the shaft 8 is provided with a similar pulley 10, but of larger diameter than the pulley 9. A suitable driving belt 11 connects these pulleys with the engine 3. It should be noticed in this connection that the rolls will rotate in opposite directions and in a direction to draw the melon or other material to be crushed between them. Furthermore, the roll 5 rotates at a greater speed than the roll 6, this arrangement insuring a very quick and sure feed as well as perfect crushing of the material. These crushing rolls or cylinders are provided with teeth 12, which coöperate and are staggered relatively to each other to crush the melon, vegetable, or fruit.

Located above the crushing rolls or cylinders is a suitable hopper 13, which is provided with downwardly inclined portions which terminate at 14 and 15 in spaced apart relation at points substantially above the axes of the cylinders. These downward inclined portions 14, 15 extending to such points above the cylinders prevent the throwing out by the same of pieces of crushed melon or other material. At the sides of the cylinders below the hopper 13 are provided vertical walls 16. Below the cylinders and extending from the vertical walls are downwardly extending inclined walls 17 spaced at their adjacent ends forming a suitable opening 18 through which the crushed material may fall. The arrangement of partitions and hopper both below and above the rotating cylinders, insures that all of the crushed melon or other fruit will fall through the opening 18, and not be thrown upwardly by the movements of the cylinders. Furthermore, the arrangement of the hopper also insures that the melons or other material will be directed between the rolls and not fall outside of them. This arrangement causes the material to be crushed to be drawn between the rolls and the teeth tearing the same to pieces and fully crushing it.

Mounted below the crushing rolls or cylinders 5 and 6 is a suitable riddle 19. In the embodiment of the invention here shown, the riddle is connected by means of links 20 to the framework of the machine. These links are provided with a plurality of openings 21 whereby the inclination of the riddle can be varied. The riddle 19 comprises an upper screen 22 which is inclined downwardly from a point to one side, across and below the opening 18, and is of a mesh sufficient to allow the seeds to pass through. Along each side of this screen are suitable railings 23, which keep the crushed melon thereupon. Immediately below the opening 18 and rigidly mounted upon these railings is an inclined catcher plate or deflector 24, which is inclined in a direction opposite to that of the inclination of the screen. The relation of the screen and deflector is such that the material as it falls through the opening 18 will be directed to the upper end of the upper screen.

Figure 2:
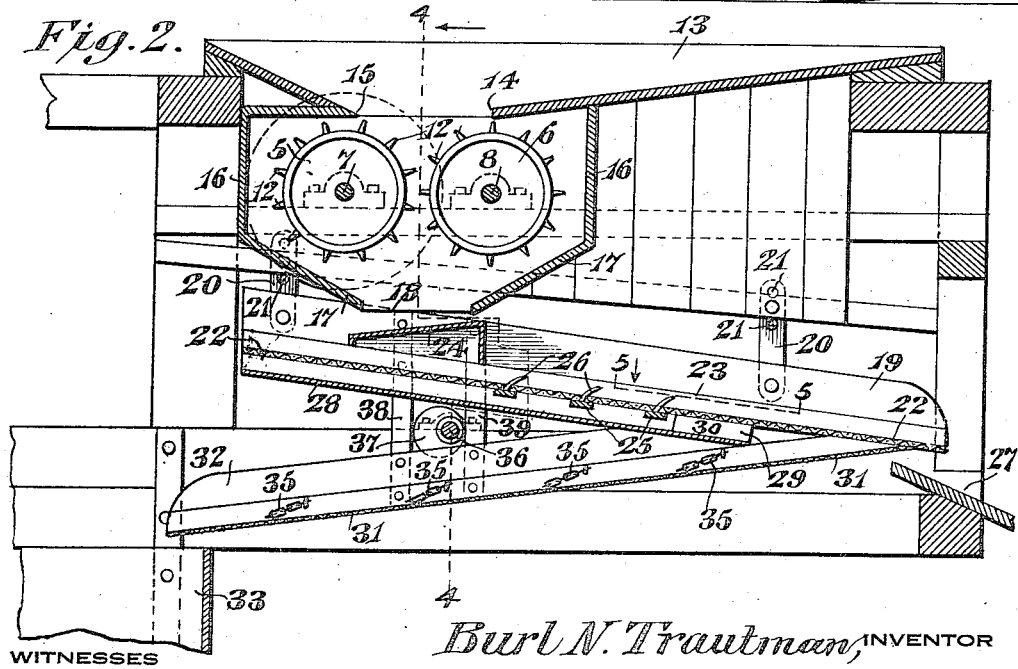
Fig. 2 is a vertical sectional view through my machine.

Extending transversely below the upper screen are a series of strips 25 provided with fingers 26 extending upwardly through the screen, these fingers being slightly inclined or curved substantially as shown in Fig. 2. The heavier pieces of material as they are rolled or jarred down the screen will be caused to rise and fall in passing over these fingers, thereby causing the seeds to drop through the screen. These fingers also serve to retard the downward movement of the particles or pieces of crushed melon, whereby the seeds will be given more time to be jarred therefrom.

The larger pieces of crushed material roll off upon the inclined chute 27 located at the lower end of the screen, and the seeds, finer pieces of pulp, and the like, drop through the screen upon the pan 28, which extends parallel with the screen and below the same. This pan directs all of the seeds and finer material to the upper end of the lower screen. The lower end of the pan is provided with converging side walls 29 forming a restricted opening 30, (Fig. 5), whereby the flow of seeds and finer material will be steadier and the material will be directed to a central point of the lower screen at the top thereof.

The lower screen 31 is fixed to the riddle 19, forming a rigid construction with the upper screen, and is inclined downwardly in a direction opposite to that of the upper screen. The screen is provided with side walls 32, and the lower end thereof terminates above a suitable receptacle 33 for receiving the seeds, the receptacle being located in the present instance below the body portion of the vehicle and is provided with a suitable door 34, through which the seeds may be removed. (Fig. 1.)

By referring to Fig. 6 it will be seen that the fine mesh of the lower screen serves to prevent the passing of seeds therethrough. The lower screen is for the purpose of separating the finer pulp and stringy material of the products, allowing these products or fine pulp to pass through the screen and the seeds to roll off at the bottom into the receptacle mentioned.

In order to more thoroughly crush the pulp which passes through the upper screen to the lower, I have provided the lower screen with a series of transversely extending chains 35, which are loose and which will be agitated during the vibration or agitation of the riddle, whereby the pulp and other material upon the screen will be crushed thoroughly and put into condition to pass through the screen, while the seeds will not be affected and will finally roll off at the lower end of the screen.

It will be understood that the movement or shaking motion imparted to the screening device, causes chains 35 to be vibrated very rapidly. The chains move in the same direction as the screen but with greater rapidity. The movement of the screen approximately 1½ inches will cause the middle portions of the chains to move from five to six inches. Said chains acting upon the screen 31, will work fine pieces of material, such as green pulp through the screen.

Upon movement of the screen in one direction, the chains have a tendency to leave the screen, and, when moved in a reverse direction, the chains strike the screen a slight blow. When the chains leave the screen as stated, the pulp material is allowed to collect under the chains; on the reverse movement, strikes the screen a dragging blow, causing the pulp material on the screen to be driven therethrough. As this operation is continued, a very effective screening action is obtained. While this is going on, the seeds on the screen bounce over the chains without any damage thereto.

For the purpose of agitating the riddle and its screens, there has been provided a transversely extending shaft 36. At each end of the shaft 36 I have provided a cam 37 which operates between the vertically extending members 38 and 39 fixed to the riddle 19 at each side thereof. (Figs. 2 and 4.) The shaft 36 is provided with a sprocket 40, which is connected by means of a sprocket chain 41 with the sprocket 42 fixed to the shaft 8. The rotation of the shaft 36 with its cams causes the oscillation of the riddle back and forth. The rate of vibration or oscillation can be regulated according to the requirements of the machine or of the material which is to be crushed. The fly wheel which I have provided on the engine coöperates with the crushing rolls to give them a steady, continuous movement to prevent jarring.

The operation of my machine is substantially as follows: The whole fruit or melon is thrown into the hopper. The cylinders rotating cause the same to be drawn therebetween and crushed, the pins or teeth serving to tear and break up the melon or other product. From the crushing device, the broken melon falls upon the catcher plate and is directed to the upper portion of the upper screen. This screen is being vibrated back and forth and jars the particles down to the lower end thereof. As they slide down, the fingers cause the heavier particles to rise and fall and allow the seeds to have free access to the screen, so that they can pass therethrough. These particles finally roll off to the ground through the chute 27. The material which passes through the upper screen falls upon a pan thereunder, as explained above, and is directed to the central portion of the upper end of the lower screen. The seeds and finer particles of pulp and all stringy material, and the like, are jarred down the lower screen, and are ground thoroughly by means of the vibrating loose chains thereof. This material and the juices escape through the meshes of the screen, while the seeds are retained thereon and are directed into the receptacle.

My construction is a simple one, yet very efficient. There are few parts to be dislocated or broken, the melons are thoroughly crushed by the arrangement of rolls, and the seeds and products are thoroughly separated by the screens. The arrangement of screens and the manner in which they coöperate with the rolls, the projecting fingers upon the upper screen and the transversely extending chains upon the lower screen all serve to provide a very useful device, which is thorough in its operation.

While I have shown and described one embodiment of the invention, it is to be understood that I do not desire to be limited to the construction herein shown and described, as variations and modifications and changes may be made in the detail construction of the present device, without departing from the spirit of the invention.

What is claimed is:—

1. In a seed extracting machine of the character described, a movable riddle inclined in one direction, and having a screening body, fingers passed upwardly through said body, and means disposed against the underside of the body to form a support therefor, and also carrying the fingers.

2. In a seed extracting machine of the character described, a movable riddle inclined in one direction, and having a screening body, fingers passed upwardly through said body, and means disposed against the underside of the body to form a support therefor, and also carrying the fingers, the fingers being bent in the direction of the inclination of said riddle.

3. In a seed extracting machine, a movable riddle, inclined in one direction and having a screening body, fingers passed upwardly through said body, and strips carrying the fingers and disposed against the underside of the body for supporting the same.

4. In a machine of the character described, a riddle provided with an inclined screen having sides extended above the same, and a series of chains spaced from each other crosswise of the screen and having their ends fixed to the sides above the screen with the major portions of said chains resting loosely upon the upper surface of said screen, and means for reciprocating the screen in a longitudinal direction to impart up and down movement to the chains away from and against the screen.

5. In a machine of the character described, a riddle provided with an inclined screen having sides extended above the same, and a series of chains spaced from each other crosswise of the screen and having their ends fixed to the sides above the screen with the major portions of said chains resting loosely upon the upper surface of said screen, and means for reciprocating the screen in a longitudinal direction to impart up and down movement to the chains away from and against the screen, the chains being of a length greater than the width of said screen for the loose hanging of the chains between the sides of the latter.

In testimony that I claim the foregoing as my own I have hereto affixed my signature in the presence of two witnesses.

BURL N. TRAUTMAN.

Witnesses:
G. W. HOUTS,
GEO. E. PENNELL.